United States Patent
Degbotse et al.

(10) Patent No.: US 8,185,420 B2
(45) Date of Patent: May 22, 2012

(54) APPROXIMATING CYCLE TIMES WITHIN MATERIAL FLOW NETWORK

(75) Inventors: Alfred Degbotse, Colchester, VT (US); Brian T. Denton, Raleigh, NC (US); Robert J. Milne, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 12/038,134

(22) Filed: Feb. 27, 2008

(65) Prior Publication Data

US 2009/0216583 A1    Aug. 27, 2009

(51) Int. Cl.
*G06Q 10/00* (2006.01)

(52) U.S. Cl. ............... 705/7; 705/1; 705/413; 705/29; 700/97; 700/99; 700/100; 700/102; 700/36; 700/107; 700/95; 700/105; 700/182; 700/106; 700/103

(58) Field of Classification Search .............. 705/7
See application file for complete search history.

(56) References Cited

U.S. PATENT DOCUMENTS

| | | | |
|---|---|---|---|
| 5,943,484 A | 8/1999 | Milne et al. | |
| 5,971,585 A | 10/1999 | Dangat et al. | |
| 6,370,509 B1 | 4/2002 | Ross et al. | |
| 6,581,068 B1 | 6/2003 | Bensoussan et al. | |
| 6,584,370 B2 | 6/2003 | Denton et al. | |
| 6,629,004 B1 | 9/2003 | Ivezic et al. | |
| 6,701,201 B2 | 3/2004 | Hegde et al. | |
| 6,748,287 B1 | 6/2004 | Hagen et al. | |
| 2004/0230445 A1 | 11/2004 | Heinzel et al. | |
| 2006/0235557 A1* | 10/2006 | Knight et al. | ............... 700/103 |

OTHER PUBLICATIONS

GroBler, Andreas & Grubner, Andre. An empirical model of the relationships between manufacturing capabilities. International Journal of Operations & Production Management, v26n5, p. 458-485, 2006 (includes References Diagrams Tables).*

Dessouky et al., "Dynamic models of production with multiple operations and general processing times", Journal of the Operational Research Society, 1997, vol. 48, pp. 647-654.

Hackman et al., "A General Framework for Modeling Production", Management Science, 1989, vol. 35, No. 4, Apr. 1989. pp. 478-495.

* cited by examiner

*Primary Examiner* — F. Zeender
*Assistant Examiner* — Fawaad Haider
(74) *Attorney, Agent, or Firm* — Hoffman Warnick LLC; Richard Kotulak

(57) ABSTRACT

Approximating cycle times within a material flow network is disclosed. One embodiment includes assigning an approximate cycle time for completion of a part number PN within the material flow network by using a model that rounds the approximate cycle time to a nearest aggregate time period and adjusting the assigned approximate cycle time based on a mathematical function representing an aggregate accuracy of an aggregation of cycle times throughout the material flow network.

16 Claims, 6 Drawing Sheets

APPROXIMATING CYCLE TIMES WITHIN MATERIAL FLOW NETWORK

BACKGROUND

1. Technical Field

The disclosure relates generally to material flow network analysis, and more particularly, to optimization methods for approximating cycle times within a material flow network.

2. Background Art

A fundamental problem faced in all manufacturing industries is the allocation of material and capacity assets to meet end customer demand. Production cycle times necessitate the advance planning of production starts, interplant shipments, and material substitutions throughout the supply chain so that these decisions are coordinated with the end customers' demand for any of a wide range of finished products (typically on the order of thousands in semiconductor manufacturing). Such advance planning depends upon the availability of finite resources which include: finished goods inventory, work in process (WIP) inventory at various stages of the manufacturing system, and work-center capacity.

Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming.

The allocation of resources also requires consideration of planning through a finite planning horizon. A typical assumption for complex resource allocation models is that the planning horizon is composed of discrete time periods (e.g., hours, days, weeks). For a given time horizon, the smaller the number of periods in the planning horizon (i.e., the greater the aggregation of time), the easier the problem is to solve from a computational perspective. Consequently, planning with fewer time periods will result in shorter execution times. However, from a solution quality perspective, a greater number of time periods, i.e., finer granularity, the greater the accuracy in the resulting solution generated using the model.

Advanced planning and scheduling systems (APSs) are used for determining the flow of production materials at the shop floor level in a manufacturing plant, as well as the flow of materials throughout the supply chain, including interplant material shipments and shipments of finished goods to end consumers. APSs are based on mathematical models for optimizing various metrics including work-in-process (WIP) and inventory levels, capacity utilization, service level considerations based on on-time delivery, and criteria for balancing multi-plant production.

A key to APS models is the modeling of material flows throughout a network formed by an extended supply chain. Such networks can be generalized to a graph $G(V,E)$ for vertices V, representing stocking points (e.g., a part number/plant combination) and the edges E, define the dependencies based on bill-of-material (BOM) or other dependencies. For example, as shown in FIG. 1, if part number (PN) A is produced from component part numbers (PN) B and C, and B and C are produced using their component part numbers (PN) D and E, respectively, and so on, then the graph would have the form illustrated. Another example of a dependency would be the time to ship a material from one inventory stocking point to another (say from a plant to a warehouse, a warehouse to a regional distribution center, or from a regional distribution center to a retail store).

APS models take graphs which define bill-of-material dependencies, such as the example in FIG. 1, and project them into a time domain. Each part number/plant combination has an associated cycle time and together the cycle times for assemblies, components, and subcomponents define a total cycle time for production of a finished product. For instance, FIG. 2 illustrates the total cycle time to produce a finished good part number (PN) A based on cycle times for all components. In the example, the raw material PNs D and E are assumed to have zero cycle time. The total cycle time to produce PN A is the sum of the cycle time for PN A (3 days) and the maximum of the cycle time for component PNs B and C (3 days) resulting in a total cycle time of 6 days. "Cycle times" are sometimes referred to as "lead times" in the field. FIG. 3 illustrates another bill of materials product structure.

For small models a suitable approach is to model cycle times in a predetermined unit of time (e.g., days) and impose a graph structure based on daily time periods, which results in a system of material balance equations that describe the flow of material from raw materials to finished goods. Such equations may have the form:

$$I_{jma} = I_{(j-1)ma} + R_{jma} + \sum_{e} \sum_{\substack{x \text{ s.t.} \\ x+G_{xmae}=j}} Y_{xmae} P_{xmae} + \sum_{n} L_{jnma} +$$

$$\sum_{v} \sum_{\substack{x \text{ s.t.} \\ x+H_{mav}=j}} T_{xmva} - \sum_{n} E_{jmna} L_{jmna} - \sum_{v} T_{jmav} - \sum_{k} \sum_{q} F_{jmakq} -$$

where $I_{jma}$ denotes the inventory at the end of period j for part m at plant a. The terms in the equations denote paths by which material may move to inventory stocking points or be removed from inventory stocking points. For instance, variables $P_{jmae}$, $L_{jnma}$, $T_{jmva}$, and $F_{jmakq}$ denote production starts, material substitutions, interplant transshipments, and customer shipments of a part, m, in period j, respectively.

Based on the choice of time periods, a set of material balance equations are generated and used to formulate a model for the APS (e.g., a linear, nonlinear or combinatorial optimization model). However, many realistic model sizes impose a need for aggregating across time to reduce the number of material balance equations significantly. Without using aggregation methods, many real world APS models would have a number of decision variables measured in the hundreds of millions and be practically unsolvable due to memory and run time requirements.

Conventional methods of aggregating are based on a myopic rounding procedure that rounds actual cycle times up or down based on their proximity to an aggregate time period. The down-side of this simple aggregation approach is that it can significantly underestimate total cycle times for producing finished products. For instance, consider FIG. 3, in which the total actual cycle time for PN A across all of its components is 9 days. If a set of aggregate time periods is set at 7-day periods (week), then a simple rounding procedure would round the individual cycle time for PN A (3 days) to 0 weeks, and round the individual cycle times for component PN B and PN C to 0 weeks. Thus, the total estimated cycle time for PN A would be inappropriately represented as 0 weeks, which is a poor approximation of the actual total cycle time of 9 days.

SUMMARY

Approximating cycle times within a material flow network is disclosed. One embodiment includes assigning an approximate cycle time for completion of a part number PN within the material flow network by using a model that rounds the approximate cycle time to a nearest aggregate time period; and adjusting the assigned approximate cycle time based on a mathematical function representing an aggregate accuracy of an aggregation of cycle times throughout the material flow network.

A first aspect of the disclosure provides a method for approximating cycle times within a material flow network, the method comprising: assigning an approximate cycle time for completion of a part number PN within the material flow network by using a model that rounds the approximate cycle time to a nearest aggregate time period; and adjusting the assigned approximate cycle time based on a mathematical function representing an aggregate accuracy of an aggregation of cycle times throughout the material flow network.

A second aspect of the disclosure provides a system for approximating cycle times within a material flow network, the system comprising: means for assigning an approximate cycle time for completion of a part number PN within the material flow network by using a model that rounds the approximate cycle time to a nearest aggregate time period; and means for adjusting the assigned approximate cycle time based on a mathematical function representing an aggregate accuracy of an aggregation of cycle times throughout the material flow network.

A third aspect of the disclosure provides a program product stored on a computer-readable medium, which when executed, approximates cycle times within a material flow network, the program product comprising program code for performing the following: assigning an approximate cycle time for completion of a part number PN within the material flow network by using a model that rounds the approximate cycle time to a nearest aggregate time period; and adjusting the assigned approximate cycle time based on a mathematical function representing an aggregate accuracy of an aggregation of cycle times throughout the material flow network.

A fourth aspect of the disclosure provides a method of approximating cycle times within a material flow network, the method comprising: rounding of cycle times for a part number to a nearest aggregate time period such that the rounding considers an impact of the rounding on the cycle time accumulated across a plurality of part numbers.

A fifth aspect of the disclosure provides a computer-readable medium that includes computer program code to enable a computer infrastructure to aggregate time periods within a material flow network, the computer-readable medium comprising computer program code for performing the method steps of the disclosure.

An sixth aspect of the disclosure provides a business method for approximation of cycle times within a material flow network, the business method comprising managing a computer infrastructure that performs each of the steps of the disclosure; and receiving payment based on the managing step.

A seventh aspect of the disclosure provides a method of generating a system for approximation of cycle times within a material flow network, the method comprising: obtaining a computer infrastructure; and deploying means for performing each of the steps of the disclosure to the computer infrastructure.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

I. Introduction

The disclosure includes methods, systems and program products for approximating cycle times within a material flow network. In particular, the disclosure includes optimizing the transformation of cycle times from cycle times that are simply rounded to nearest aggregate time periods to more accurate approximations. In contrast to conventional approaches of myopically rounding cycle times to the nearest period length, the disclosed methods use a heuristic to solve a formal representation of the problem as a mathematical model. General methodologies within this field of study include advanced planning systems, optimization and heuristic based algorithms, constraint based programming, and simulation. The disclosure may be integrated with an advanced planning system for optimizing established planning objectives (e.g., customer service, short lead times, low inventory, and prioritized allocation of supply and capacity) to compute a feasible production plan for an enterprise while considering approximation of cycle times.

The disclosure is described in the context of supply-chain planning in the context of bill-of-material dependencies. However, it is generally applicable to aggregation methods for problems involving the modeling of distribution problems and other network flow problems. In environments other than a strict manufacturing material flow network, part number may include any task that is to be evaluated and material flow network may include tasks rather than simply material. For example, in professional services setting, part number (PN) may identify a task (e.g., type a paper, clean a window, file a document, etc.) to be completed within a certain amount of time.

One embodiment of the method applies an algorithmic approach to the design of material flow networks for the purpose of reducing the size of the network. A nonlinear discrete optimization model is defined herein which describes the aggregation model. The model itself is NP-complete, and solving general (large-scale) instances of the model exactly is effectively impossible. Therefore, the disclosure employs a heuristic method for determining near optimal solutions within a reasonable run time. As a result, the disclosure enables the accurate computational approximation of cycle times within material flow networks.

II. System Overview

Figure 5:
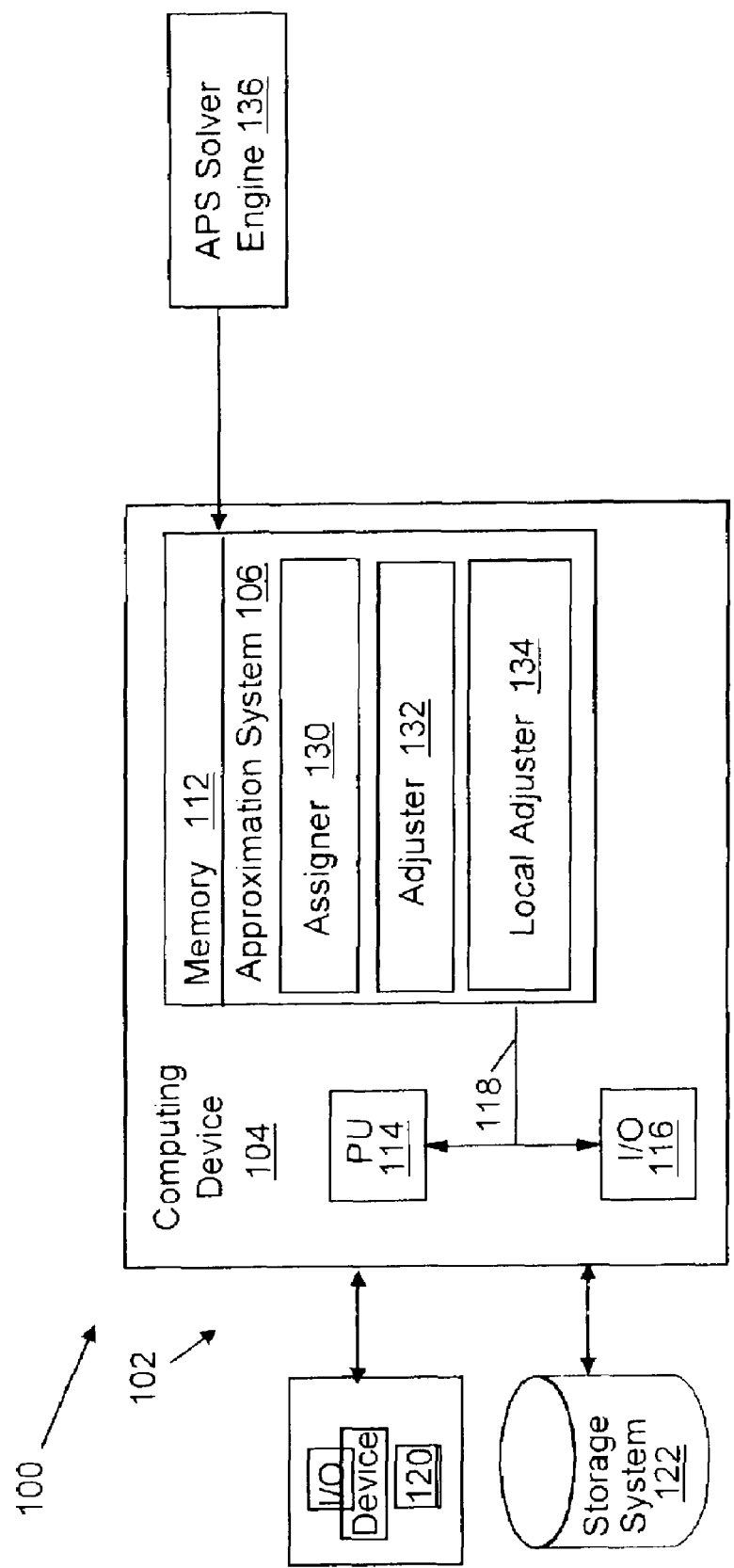
FIG. 5 shows a block diagram of a computer environment for implementing methods according to the disclosure.

Turning to the drawings, FIG. 5 shows an illustrative environment 100 for approximating cycle times within a material flow network. To this extent, environment 100 includes a computer infrastructure 102 that can perform the various process steps described herein for approximation of cycle times within a material flow network. In particular, computer infrastructure 102 is shown including a computing device 104 that comprises an approximation system 106, which enables computing device 104 to approximate cycle times within a material flow network by performing the processes of the disclosure.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as approximation system 106, that is stored in memory 112 and/or storage system 122. While executing computer program code, processor 114 can read and/or write data, such as aggregation, to/from memory 112, storage system 122, and/or I/O interface 116. Bus 118 provides a communications link between each of the components in computing device 104. I/O device 118 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In any event, computing device 104 can comprise any general purpose computing article of manufacture capable of executing computer program code installed by a user (e.g., a personal computer, server, handheld device, etc.). However, it is understood that computing device 104 and approximation system 106 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, approximation system 106 enables computing infrastructure 102 to approximate cycle times within a material flow network. To this extent, approximation system 106 is shown including an assigner 130, an adjuster 132 and a local adjuster 134. A conventional APS solver 136 may also be employed as part of approximation system 106, or (as shown) a separate system. Operation of each of these systems is discussed further below. However, it is understood that some of the various systems shown in FIG. 5 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100.

III. Operational Methodology

A. Definitions

The disclosure employs the following definitions relative to the operational methodology:

"Cycle time" is an amount of time to complete a task within the material flow network, typically manufacture a part.

"Time period" is the granularity of time used to evaluate the material flow network, e.g., daily, weekly, monthly increments.

"Part number" PN is an identifier of a component (part) to be used to manufacture an end product, which also has a part number. In environments other than a strict manufacturing material flow network, part number may include any task that is to be evaluated and material flow network may include tasks rather than simply material. For example, in professional services settings, part number PN may identify a task (e.g., type a paper, clean a window, file a document, etc.) to be completed within a certain amount of time.

"Real time periods" t (index t=1, . . . T) are uniform, highly granular time periods in which real cycle times are measured (e.g., in minutes, hours, days, etc.).

"Aggregate time periods" p (index p=1, . . . P) are not necessarily uniform time periods (e.g., weeks, months) in which approximate cycle times are measured. Aggregate time period p corresponds to an integer multiple of real time periods. For example, an aggregate time period may be in weekly increments, a 7 times multiple of real time periods measured in daily increments. The data fed as input to an APS solver engine is provided in terms of these aggregate time periods. "Aggregate time period" p(t) denotes the aggregate time period in which a real time period t falls. For example, where a real time period t is 13 days and the aggregate time periods are in weekly increments, the aggregate time period p(t) for this real time period is 2, indicating the $2^{nd}$ aggregate time period or $2^{nd}$ week.

"Last real time period" t(p) denotes the last real time period corresponding to aggregate time period p. That is, it's the latest real time period which falls within aggregate time period p. Here, t(0) denotes the latest real time period before the beginning of the horizon.

"Number of aggregate periods" n(t, t') denotes the number of aggregate time periods between real time periods t and t'.

"Real cycle time" RCT(PN, t) denotes a time to manufacture part number PN from existing components beginning production of PN at time t (i.e. based on start date time effectiveness). RCT(PN, t) and other data (and variables) are set to zero when t is negative (i.e., earlier than the beginning of the first period of the planning horizon) or when the data (or variable) is otherwise undefined.

"Approximate cycle time" ACT(PN, p) denotes an approximation based on the need for "rounding" cycle time to an integral number of time periods to manufacture part number PN completing production in aggregate time period p(t) from existing components (i.e., based on stock date time effectiveness). This approximate cycle time is the cycle time used in the APS model, and is expressed in an integral number of aggregate time periods.

"End product identifier" X(PN, PN') denotes a constant that is 1 if the PN at issue is built directly from PN' and 0 otherwise. PN' is a component of PN, i.e., there may be more than one PN for a given PN. For instance, a desk (PN) may be made out of a compound of legs, drawers, etc. This variable encodes bill-of-material information.

"Total real time" TRT(PN, t) denotes the total real time to manufacture part number PN completing production at time t from raw materials based on: TRT(PN, t)=RCT(PN, s such that s+RCT(PN,s)=t)+max(0, max$_{\{PN',s|X(PN,PN')=1\}}$ {TRT (PN', s)}). "s" is a real time period (just as t is a real time period). In the preceding calculation, s is the real time period such that s+RCT(PN,s)=t. Less formally, s may be viewed as the real time at which part PN begins its manufacture, while t is the real time at which it completes its manufacture.

"Total approximate time" TAT(PN, p) denotes the total approximate time (in "real" time) to manufacture part number PN to completion from raw materials in period p, based on decisions made relative to ACT(PN, p).

"Underestimating penalty" WU(PN, p) denotes a constant factor representing the relative penalty associated with underestimating total cycle time for part number PN in real time period t.

"Overestimating penalty" WO(PN, p) denotes a constant factor denoting the relative penalty associated with overestimating total cycle time for part number PN in real time period t.

"Deficiency time" A(PN, p) denotes a decision variable that is the difference between total real time to manufacture a part number and total approximate time to manufacture the part number when the former exceeds the latter and zero otherwise, i.e., max(0, TRT(PN, t(p))−TAT(PN, p)). Deficiency time A(PN, p) represents the amount by which a part's approximate cycle time ACT(PN, p) from raw materials is short of (deficient) the total real cycle time RCT(PN, p) resulting from the aggregation decisions made, e.g., using week increments instead of daily increments, how time rounded, etc.

"Exceed time" B(PN, p) denotes a decision variable that is the difference between total approximate time to manufacture a part number and total real time to manufacture the part number when the former exceeds the latter and zero otherwise, i.e., max(0,TAT(PN, p)−TRT(PN, t(p)). Exceed time B(PN, p) represents the amount by which a part's approximate cycle time ACT(PN, p) from raw materials exceeds the total real cycle time RCT(PN, p) resulting from the aggregation decisions made, e.g., using week increments instead of daily increments, how time rounded, etc.

B. Aggregating Methodology

Figure 6:
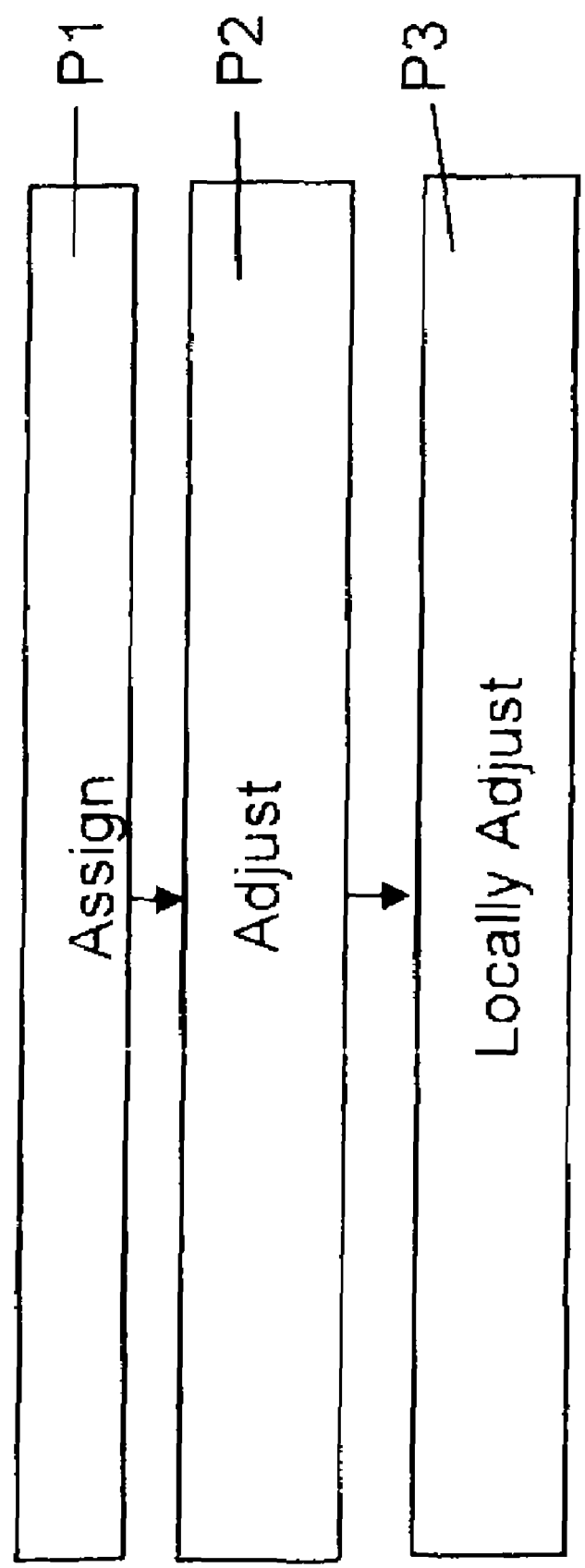
FIG. 6 shows a flow diagram illustrating embodiments of methods according to the disclosure.

Referring to FIG. 6, in conjunction with FIG. 5, one embodiment of an optimization method for approximating cycle times within a material flow network, will now be described. Methods according to the disclosure rounds cycle times for a part number to a nearest aggregate time period such that the rounding considers an impact of the rounding on the cycle time accumulated across a plurality of part numbers.

At the outset, for all part numbers (PNs), a low level code (LLC) is defined for part level identification purposes. For example, an LLC may include index I=0, . . . L, wherein finished good parts are assigned I=1, direct components are assigned I=2, I=3, I=4, etc., and raw materials are assigned I=L. (For more information on low-level-codes LLC, refer to U.S. Pat. No. 6,584,370).

Figure 1:
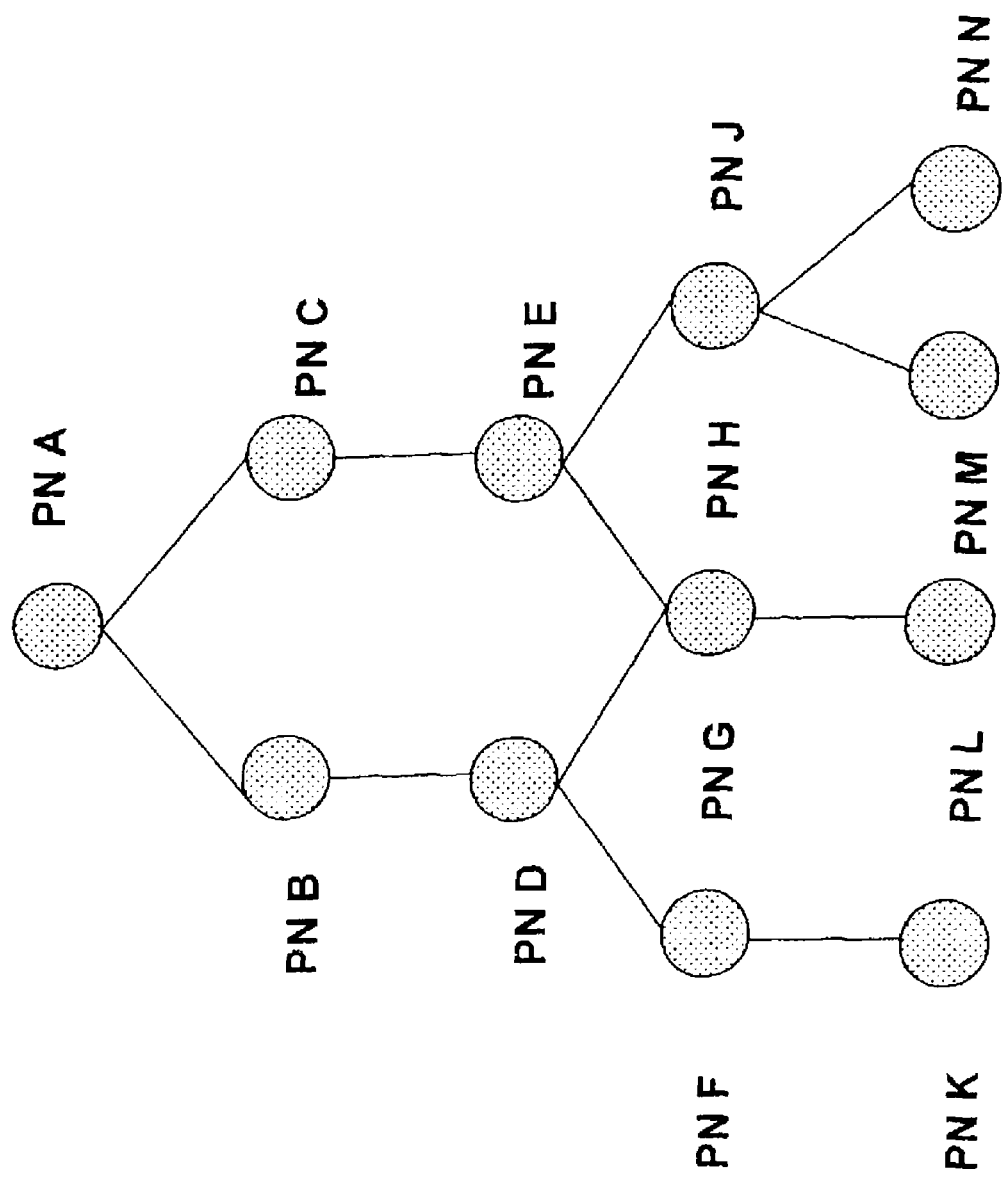
FIG. 1 shows a conventional multi-level, multi-part-number, bill-of-material structure.
Figure 2:
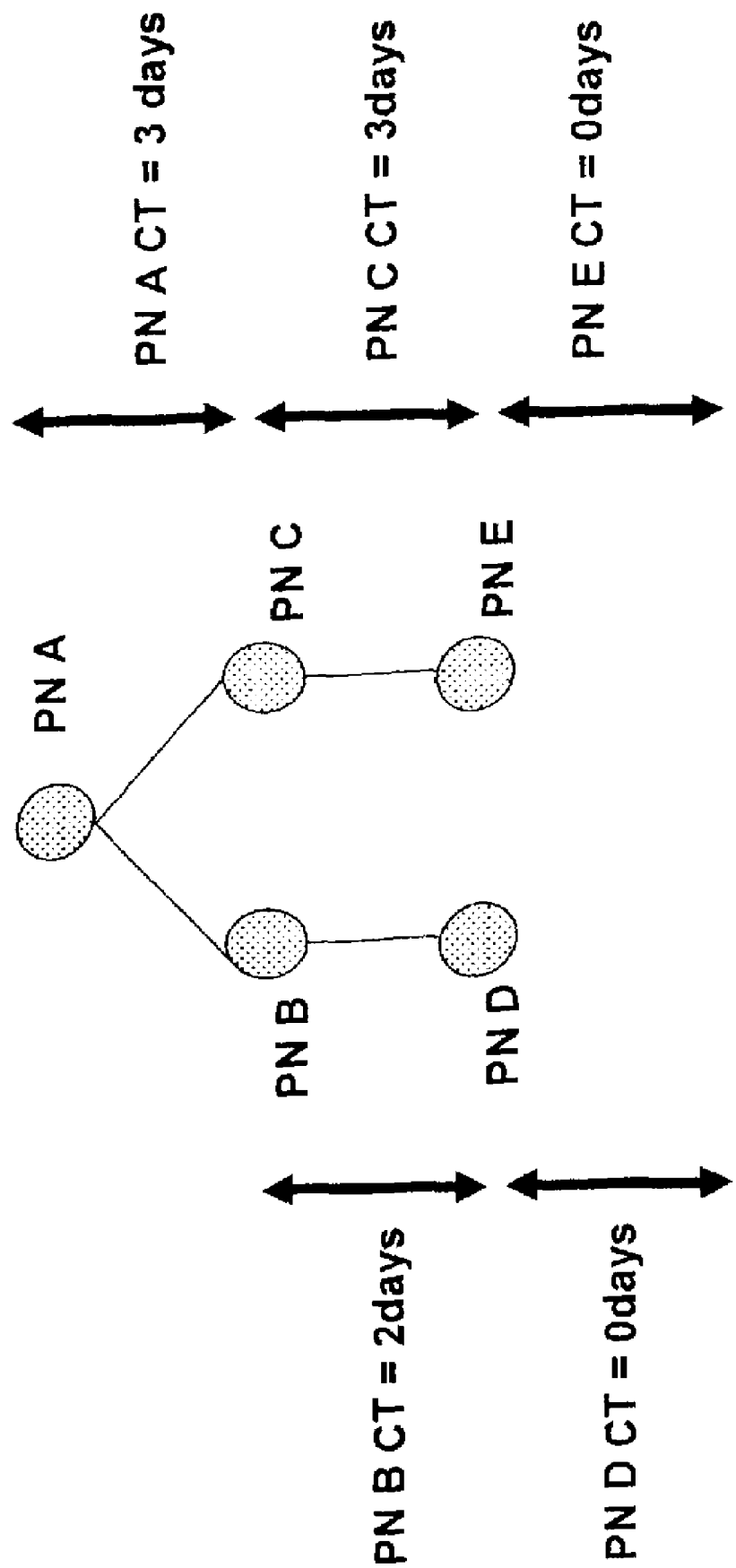
FIG. 2 shows conventional multiple levels of bill-of-material with cycle times.
Figure 3:
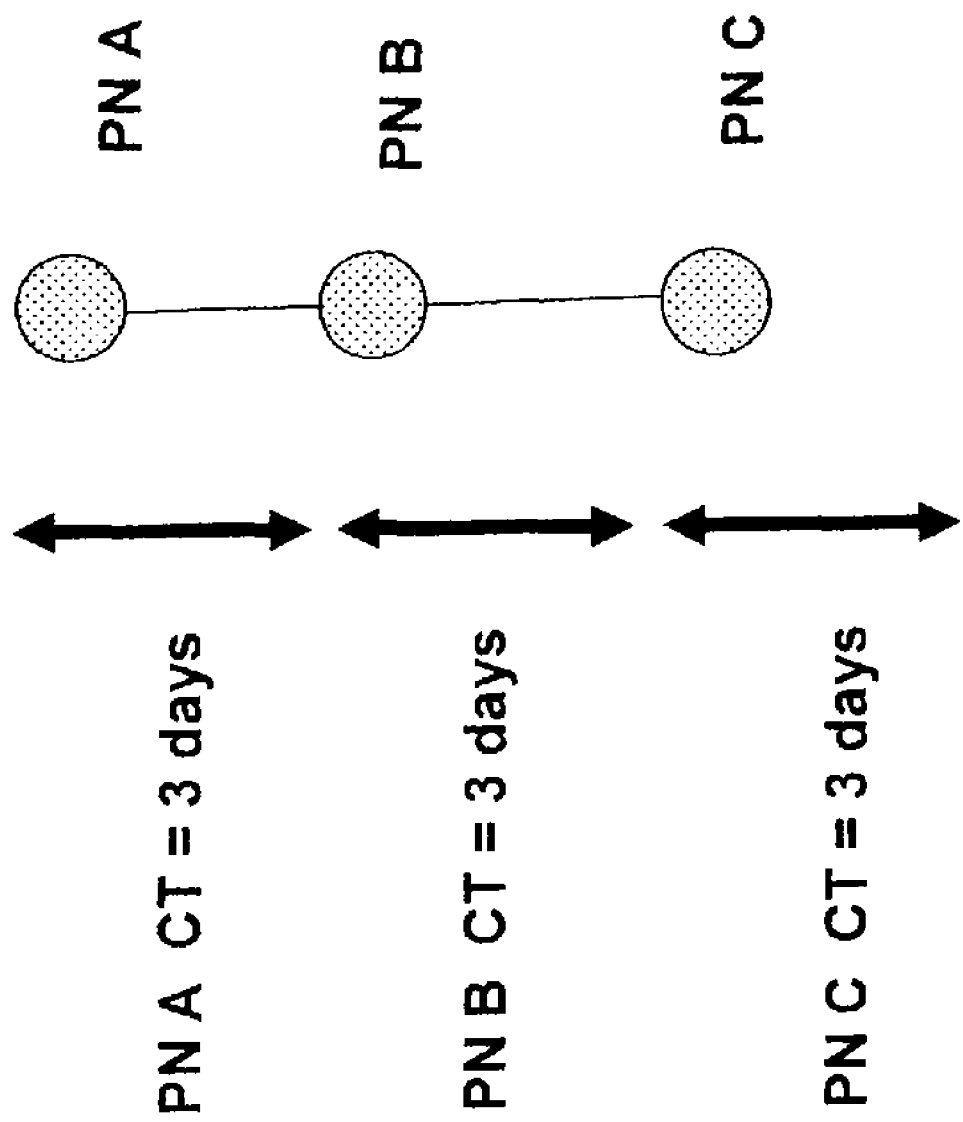
FIG. 3 shows a conventional myopic time aggregation heuristic based on simple rounding of cycle times.
Figure 4:
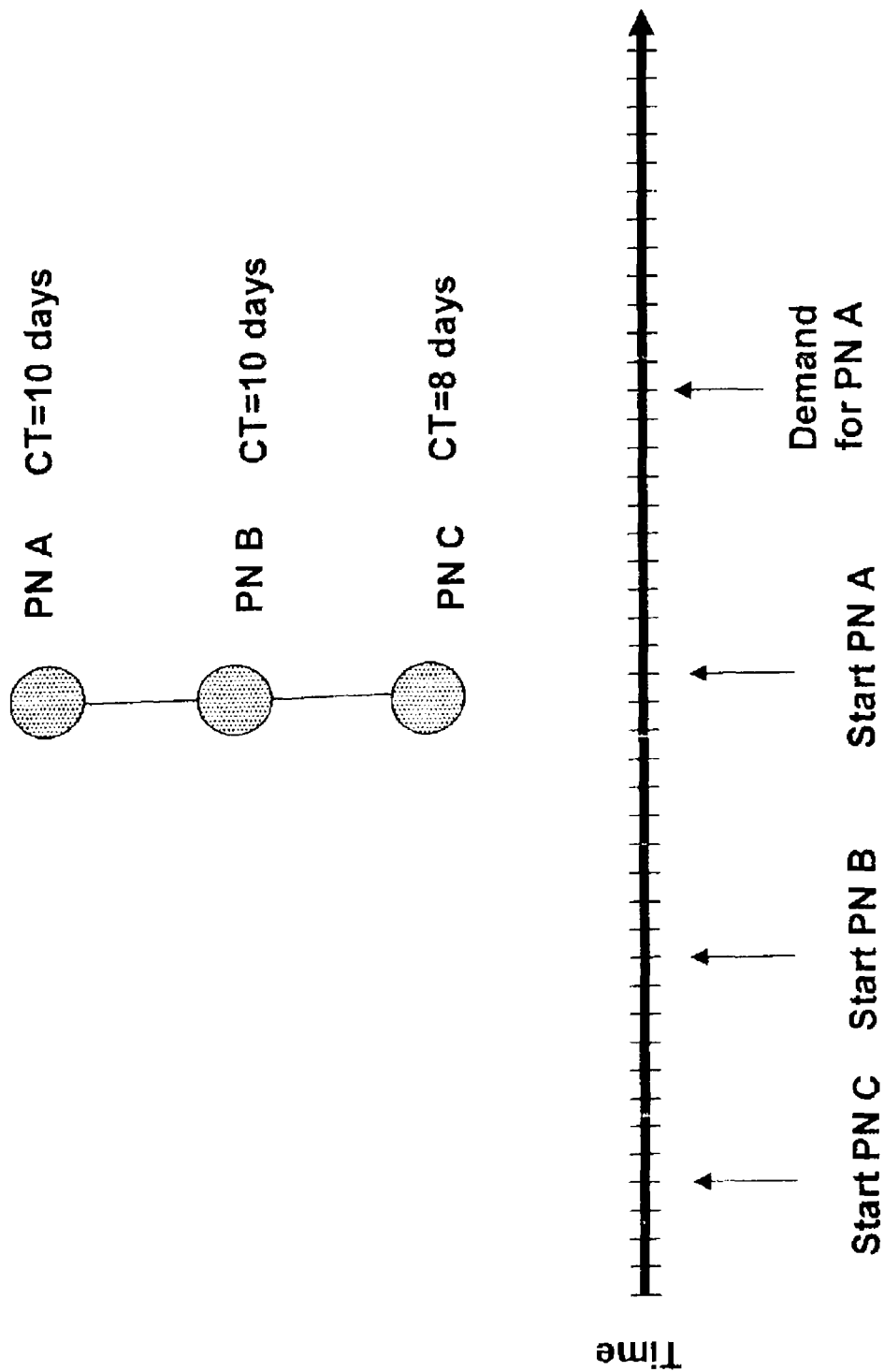
FIG. 4 shows conventional time dependency among part numbers related by bill-of-material relationships.

In process P1, assigner 130 assigns an approximate cycle time for completion (manufacture) of a part number within the material flow network by using a model that rounds the approximate cycle time to a nearest aggregate time period. That is, approximate cycle time ACT(PN, p) is assigned to part numbers PN by using simple rounding to an aggregate time period. Again, consider the example of FIG. 3, in which the total actual cycle time for PN A across all of its components is 9 days. If a set of aggregate time periods of 7-day periods (week) is assumed, then a simple rounding procedure would round the individual cycle time for PN A (3 days) to 0 weeks, and in turn round the individual cycle times for component PN B and PN C to 0 weeks. Thus, the total approximate cycle time for PN A would be inappropriately represented as 0 weeks, which is a poor approximation of the actual total cycle time of 9 days. That is, the approximation does not consider the impact of the rounding, and hence is inaccurate. Had the individual cycle times of PN A, PN B, and PN C each been 4 days, then the simple rounding would have rounded them up to 1 week each for a total approximate cycle time of 3 weeks (21 days) which is also a poor approximation of the actual total cycle time of 9 days.

In process P2, adjuster 132 adjusts the assigned approximate cycle time based on a (objective) mathematical function representing an aggregate accuracy of an aggregation of cycle times throughout the material flow network. In one embodiment, this process includes selecting an approximate cycle time ACT(PN, p) for a part number PN in an aggregate time period p, which minimizes an aggregation of weighted average rounding errors Z' over all parts/periods explored. To this end, this process may include initially marking all part numbers PN and aggregate time period for the part numbers PN as "unexplored," i.e., to identify which have been evaluated for improvement. For each part level identification (i.e. for each level code in sequence), each aggregate time period and each part number PN with the part level, adjuster 132 marks the part number as "explored" and determines an approximate cycle time ACT(Pn, p) that minimizes a weighted average of accumulated rounding error Z. In this case, Z is the minimum value of the sum over all part numbers and aggregate time periods that have been explored of a first product of underestimating penalty WU(PN, p) and deficiency time A(PN, p) and a second product of overestimating penalty WO(PN, p) and exceed time B(PN, p). That is, $$Z=\text{Min}\{\text{Sum}_{\{PN,p|PN,p \text{ has been explored}\}}(WU(PN,p)*A(PN,p)+WO(PN,p)*B(PN,p))\},$$

where, per the above definitions, WU(Pn, p) is an underestimating penalty associated with underestimating total cycle time for part number PN in time period t, A(PN, p) is a deficiency time period representing a difference between total real time to manufacture part number PN and total approximate time to manufacture the part number when the former exceeds the latter and zero otherwise, WO(PN, p) is an overestimating penalty associated with overestimating total cycle time for part number PN in time period t, and B(PN, p) is a difference between total approximate time to manufacture partner number PN and total real time to manufacture the part number when the former exceeds the latter and zero otherwise.

Process P2 of adjusting may be performed in a sequence which depends on low level code, which may be stated logically as, for example:

```
For (l=0 to L){
    For (p = 1 to P){
        For (all PN with part level l){
            Mark PN, p as "explored"
            Choose ACT(PN,p) to minimize objective Z
            where Z = Min{Sum_{PN,p| PN, p has been explored}
                (WU(PN,p)*A(PN,p) + WO(PN,p)*B(PN,p))}
        }
    }
}
```

In one embodiment of process P2, the approximate cycle time ACT(PN, p) determination may be performed by setting ACT(PN, p) to the rounded up and rounded down value of real cycle time RCT(PN, t(p)) and picking whichever one of the rounded up and rounded down values results in the smaller value of Z. For example, where a real cycle time of a part number PN is 18 days, and the time periods are in week increments, the rounded up approximate cycle time ACT(PN, p) would result in 3 time periods (i.e., 18 rounded up to 21 days so that 3 time periods are required), and the rounded down approximate cycle time ACT(PN, p) would be 2 time periods (i.e., 18 days rounded down to 14 days so that 2 time periods are required). Whichever of the 2 time periods or 3 time periods results in an improvement in Z' is selected as the adjusted cycle time.

In one embodiment, the mathematical problem may be solved such that at least some of the following constraints are satisfied:

1. A difference between a total real time to manufacture a part and a total approximate time to manufacture a part equals a difference between the deficiency time $A(PN, p)$ and the exceed time $B(PN, p)$ for the part number for a particular aggregate time period. That is, $TRT(PN,t(p))-TAT(PN,p)=A(PN,p)-B(PN,p)$. This constraint assigns the rounding error to deficiency time $A(PN, p)$ and exceed time $B(PN, p)$.

2. Total approximate time $TAT(PN, p)$ (through raw materials) for the part and the aggregate time period equals the adjusted approximate cycle time $ACT(PN, p)$ plus a total approximate time of a maximum (longest) cycle time of components of the part. That is, $TAT(PN, p)=ACT(PN, p)+\max\{1, \max_{\{PN'''|x(PN,PN')=1\}}\{TAT(PN', p-n(t(p), t(p)-ACT(PN, p))\}\}$.

3. The adjusted approximate cycle time ACT(PN, p) corresponds to an integral number of real time periods. That is, adjusted approximate cycle time $ACT(PN,p)$ belongs to the set $\{0, t(p)-t(p-1), t(p)-t(p-2), t(p)-t(p-3), \ldots, t(p)-t(1), t(p)-t(0)\}$.

4. Total approximate time, deficiency time and exceed time are not to be negative values for all part numbers and aggregate time periods. That is, $TAT(PN, p), A(PN, p), B(PN, p)>=0$ for all PN, p.

The above defined mathematical problem (model) is a non-linear discrete optimization problem. Such problems belong to a class of problems that are defined as intractable. Therefore, developing an algorithm which solves the problem and guarantees optimization with reasonable run time characteristics is unlikely. According to the disclosure, heuristics may be used to find near optimal solutions for approximating cycle times.

In an optional process P3, local adjuster 134 explores local adjustments to the results of process P2 to identify improvements. This process includes local analyzer 134 evaluating a nearest neighbor aggregate time periods (upper and lower) for the approximate cycle time ACT(PN, p) for all part numbers PN and aggregate time periods p and instituting the adjustment to the nearest neighbor aggregate time period if the value of Z' is lowered.

Alternative objective mathematical functions could be considered. For instance, minimizing mean square error of deficiency time and exceed time in which larger deviations of deficiency time and exceed time are weighted more heavily than smaller ones may be employed. This may be more appropriate for some applications. An illustrative equation may be:

$$Z=\text{Min}\{\text{Sum}_{\{PN,p|PN, p \text{ has been explored}\}}(WU(PN,p)*A(PN,p)^2+WO(PN,p)*B(PN,p)^2)\}.$$

In applying the above method to a distribution problem, when a part may be shipped in both directions between two locations, each of the part number and location combinations would have the same LLC. When the part may be sent in only one direction, the part number and shipping_location would have an LLC equal to that of the part number and receiving_location's LLC+a positive number (say 1 for example). The above method can be extended to cover the situation where a part number has alternative processes (with potentially alternative cycle times or alternative components) by adding "process" as a subscript along with part number PN.

IV. Closing

As discussed herein, various systems and components are described as "obtaining" data. It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

While shown and described herein as a method and system for approximation of cycle times within a material flow network, it is understood that the disclosure further provides various alternative embodiments. That is, the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc. In one embodiment, the disclosure can take the form of a computer program product accessible from a computer-usable or computer-readable medium providing program code for use by or in connection with a computer or any instruction execution system, which when executed, enables a computer infrastructure to approximation of cycle times within a material flow network. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, such as memory 112, magnetic tape, a removable computer diskette, a random access memory (RAM), a read-only memory (ROM), a tape, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processing unit 114 coupled directly or indirectly to memory elements through a system bus 118. The memory elements can include local memory, e.g., memory 112, employed during actual execution of the program code, bulk storage (e.g., storage system 122), and cache memories which provide temporary storage of at least some program code in order to reduce the number of times code must be retrieved from bulk storage during execution.

In another embodiment, the disclosure provides a method of generating a system for approximation of cycle times within a material flow network. In this case, a computer infrastructure, such as computer infrastructure 102 (FIG. 5), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 104 (FIG. 5), from a computer-readable medium; (2) adding one or more computing devices to the computer infrastructure; and (3) incorporating and/or modifying one or more existing systems of the computer infrastructure, to enable the computer infrastructure to perform the process steps of the disclosure.

In still another embodiment, the disclosure provides a business method that performs the process described herein on a subscription, advertising, and/or fee basis. That is, a service provider, such as an application service provider (ASP), could offer to approximate cycle times within a material flow network as described herein. In this case, the service provider can manage (e.g., create, maintain, support, etc.) a computer infrastructure, such as computer infrastructure 102 (FIG. 5), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. In one embodiment, the present disclosure may be programmed in C/C++. It should be understood by those of ordinary skill in the art, however, that the present disclosure is not limited to the above implementation and is independent of the computer/system architecture.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person skilled in the art are intended to be included within the scope of the disclosure as defined by the accompanying claims.

What is claimed is:

1. A method for approximating cycle times within a material flow network, performed using at least one computing device, the method comprising:

assigning an approximate cycle time for completion of a part number PN within the material flow network by using a model that rounds the approximate cycle time to a nearest aggregate time period, using the at least one computing device;

adjusting the assigned approximate cycle time based on a mathematical function representing an aggregate accuracy of an aggregation of cycle times throughout the material flow network, using the at least one computing device, wherein the adjusting includes selecting an approximate cycle time (ACT(PN, p)) for the part number PN in an aggregate time period p that minimizes an aggregation of weighted average rounding errors Z over all part numbers and time periods explored; and making local improvements to the adjusted approximate cycle time through adjustment of aggregate time periods to nearest neighbors in the material flow network, wherein the making includes evaluating a nearest neighbor aggregate time period for the adjusted approximate cycle time for all part numbers PN and aggregate time periods p and instituting an adjustment to the nearest neighbor aggregate time period if the aggregation of the weighted average rounding error Z is lowered.

2. The method of claim 1, wherein the selecting includes calculating the aggregation of the weighted average rounding error Z according to the following:

$$Z=\text{Min}\{\text{Sum}\{PN,p|PN,p \text{ has been explored}\}(WU(PN, p)*A(PN,p)+WO(PN,p)*B(PN,p))\},$$

wherein WU(Pn, p) is an underestimating penalty associated with underestimating total cycle time for part number PN in time period t, A(PN, p) is a deficiency time period representing a difference between total real time to manufacture part number PN and total approximate time to manufacture the part number when the former exceeds the latter and zero otherwise, WO(PN, p) is an overestimating penalty associated with overestimating total cycle time for part number PN in time period t, and B(PN, p) is a difference between total approximate time to manufacture partner number PN and total real time to manufacture the part number when the former exceeds the latter and zero otherwise.

3. The method of claim 2, wherein the calculating includes satisfying that:

a) a difference between the total real time and the total approximate time to manufacture a part number equals a difference between the deficiency time A(PN, p) and the exceed time B(PN, p) for the part number for a particular aggregate time period;

b) the total approximate time for the part number and the aggregate time period equals the adjusted approximate cycle time plus a total approximate time of a maximum cycle time of components of the part number; and c) the adjusted approximate cycle time corresponds to an integral number of real time periods.

4. The method of claim 2, wherein the adjusting further includes selecting the approximate cycle time (ACT(PN, p)) for the part number PN in the aggregate time period p that minimizes mean square error of the deficiency time and the exceed time in which larger deviations of the deficiency time and the exceed time are weighted more heavily than smaller ones.

5. A system for approximating cycle times within a material flow network, the system comprising:
at least one computing device configured to perform the following:
assign an approximate cycle time for completion of a part number PN within the material flow network by using a model that rounds the approximate cycle time to a nearest aggregate time period;
adjust the assigned approximate cycle time based on a mathematical function representing an aggregate accuracy of an aggregation of cycle times throughout the material flow network,
wherein the adjusting includes selecting an approximate cycle time (ACT(PN, p)) for the part number PN in an aggregate time period p that minimizes an aggregation of weighted average rounding errors Z over all part numbers and time periods explored; and
make local improvements to the adjusted approximate cycle time through adjustment of aggregate time periods to nearest neighbors in the material flow network,
wherein the making includes evaluating a nearest neighbor aggregate time period for the adjusted approximate cycle time for all part numbers PN and aggregate time periods p and instituting an adjustment to the nearest neighbor aggregate time period if the aggregation of the weighted average rounding error Z is lowered.

6. The system of claim 5, wherein the adjusting includes selecting the approximate cycle time by calculating the aggregation of weighted average rounding error Z according to the following:

$$Z=\text{Min}\{\text{Sum}\{PN,p|PN,p \text{ has been explored}\}(WU(PN, p)*A(PN,p)+WO(PN,p)*B(PN,p))\}$$

wherein WU(Pn, p) is an underestimating penalty associated with underestimating total cycle time for part number PN in time period t, A(PN, p) is a deficiency time period representing a difference between total real time to manufacture part number PN and total approximate time to manufacture the part number when the former exceeds the latter and zero otherwise, WO(PN, p) is an overestimating penalty associated with overestimating total cycle time for part number PN in time period t, and B(PN, p) is a difference between total approximate time to manufacture partner number PN and total real time to manufacture the part number when the former exceeds the latter and zero otherwise.

7. The system of claim 6, wherein the adjusting includes calculating the aggregation of weighted average rounding error Z while satisfying that:
a) a difference between the total real time and the total approximate time to manufacture a part number equals a difference between the deficiency time A(PN, p) and the exceed time B(PN, p) for the part number for a particular aggregate time period;
b) the total approximate time for the part number and the aggregate time period equals the adjusted approximate cycle time plus a total approximate time of a maximum cycle time of components of the part number;
c) the adjusted approximate cycle time corresponds to an integral number of real time periods; and
d) the total approximate time, the deficiency time and the exceed time are not to be negative values for all part numbers and aggregate time periods.

8. The system of claim 6, wherein the adjusting further includes selecting the approximate cycle time (ACT(PN, p)) for the part number PN in the aggregate time period p that minimizes mean square error of the deficiency time and the exceed time in which larger deviations of the deficiency time and the exceed time are weighted more heavily than smaller ones.

9. The system of claim 5, wherein the adjusting includes performing a sequence which depends on low level code.

10. A program product stored on a computer-readable medium, which when executed, approximates cycle times within a material flow network, the program product comprising program code for performing the following:
assigning an approximate cycle time for completion of a part number PN within the material flow network by using a model that rounds the approximate cycle time to a nearest aggregate time period;
adjusting the assigned approximate cycle time based on a mathematical function representing an aggregate accuracy of an aggregation of cycle times throughout the material flow network,
wherein the adjusting includes selecting an approximate cycle time (ACT(PN, p)) for the part number PN in an aggregate time period p that minimizes an aggregation of weighted average rounding errors Z over all part numbers and time periods explored; and
making local improvements to the adjusted approximate cycle time through adjustment of aggregate time periods to nearest neighbors in the material flow network,
wherein the making includes evaluating a nearest neighbor aggregate time period for the adjusted approximate cycle time for all part numbers PN and aggregate time periods p and instituting an adjustment to the nearest neighbor aggregate time period if the aggregation of the weighted average rounding error Z is lowered.

11. The program product of claim 10, wherein the selecting includes calculating the aggregation of weighted average rounding error Z according to the following:

$$Z=\text{Min}\{\text{Sum}\{PN,p|PN,p \text{ has been explored}\}(WU(PN, p)*A(PN,p)+WO(PN,p)*B(PN,p))\}$$

wherein WU(Pn, p) is an underestimating penalty associated with underestimating total cycle time for part number PN in time period t, A(PN, p) is a deficiency time period representing a difference between total real time to manufacture part number PN and total approximate time to manufacture the part number when the former exceeds the latter and zero otherwise, WO(PN, p) is an overestimating penalty associated with overestimating total cycle time for part number PN in time period t, and B(PN, p) is a difference between total approximate time to manufacture partner number PN and total real time to manufacture the part number when the former exceeds the latter and zero otherwise.

12. The program product of claim 11, wherein the calculating includes satisfying that:
a) a difference between the total real time and the total approximate time to manufacture a part number equals a difference between the deficiency time A(PN, p) and the exceed time B(PN, p) for the part number for a particular aggregate time period;
b) the total approximate time for the part number and the aggregate time period equals the adjusted approximate cycle time plus a total approximate time of a maximum cycle time of components of the part number;
c) the adjusted approximate cycle time corresponds to an integral number of real time periods; and d) the total approximate time, the deficiency time and the exceed time are not to be negative values for all part numbers and aggregate time periods.

13. The program product of claim 11, wherein the adjusting further includes selecting the approximate cycle time (ACT (PN, p)) for the part number PN in the aggregate time period p that minimizes mean square error of the deficiency time and the exceed time in which larger deviations of the deficiency time and the exceed time are weighted more heavily than smaller ones.

14. The program product of claim 10, wherein the adjusting code performs in a sequence which depends on low level code.

15. A method of approximating cycle times within a material flow network using at least one computing device, the method comprising:
rounding of cycle times for a part number to a nearest aggregate time period such that the rounding considers an impact of the rounding on the cycle time accumulated across a plurality of part numbers, using the at least one computing device;
wherein the rounding includes selecting an approximate cycle time (ACT(PN, p)) for a part number PN in an aggregate time period p that minimizes an aggregation of weighted average rounding errors Z over all part numbers and time periods explored;
wherein the selecting is performed using the at least one computing device, the selecting including calculating the aggregation of weighted average rounding error Z according to the following:

$$Z = \text{Min}\{\text{Sum}\{PN, p | PN, p \text{ has been explored}\}(WU(PN, p)*A(PN, p) + WO(PN, p)*B(PN, p))\},$$

wherein WU(Pn, p) is an underestimating penalty associated with underestimating total cycle time for part number PN in time period t, A(PN, p) is a deficiency time period representing a difference between total real time to manufacture part number PN and total approximate time to manufacture the part number when the former exceeds the latter and zero otherwise, WO(PN, p) is an overestimating penalty associated with overestimating total cycle time for part number PN in time period t, and B(PN, p) is a difference between total approximate time to manufacture partner number PN and total real time to manufacture the part number when the former exceeds the latter and zero otherwise.

16. The method of claim 15, wherein the calculating includes satisfying that:
a) a difference between the total real time and the total approximate time to manufacture a part number equals a difference between the deficiency time A(PN, p) and the exceed time B(PN, p) for the part number for a particular aggregate time period;
b) the total approximate time for the part number and the aggregate time period equals the adjusted approximate cycle time plus a total approximate time of a maximum cycle time of components of the part number;
c) the adjusted approximate cycle time corresponds to an integral number of real time periods; and
d) the total approximate time, the deficiency time and the exceed time are not to be negative values for all part numbers and aggregate time periods.

\* \* \* \* \*